United States Patent
Kim et al.

(10) Patent No.: US 7,028,163 B2
(45) Date of Patent: *Apr. 11, 2006

(54) APPARATUS FOR CONTROLLING MULTI-WORD STACK OPERATIONS USING A MULTI-BANK STACK IN DIGITAL DATA PROCESSORS

(75) Inventors: Yong-Chun Kim, Yongin-shi (KR); Hong-Kyu Kim, Yongin-shi (KR); Seh-Woong Jeong, Yongin-shi (KR)

(73) Assignee: Samsung Electronics, Co., Ltd., Xyungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 125 days.

(21) Appl. No.: 09/338,473

(22) Filed: Jun. 22, 1999

(65) Prior Publication Data

US 2004/0034733 A1    Feb. 19, 2004

(30) Foreign Application Priority Data

Jun. 22, 1998 (KR) ............................... 1998-23335
Sep. 29, 1998 (KR) ............................... 1998-40587

(51) Int. Cl.
*G06F 12/12* (2006.01)
(52) U.S. Cl. ...................... 712/202; 711/132
(58) Field of Classification Search ............ 712/202; 711/132
See application file for complete search history.

(56) References Cited

U.S. PATENT DOCUMENTS

| | | | | |
|---|---|---|---|---|
| 4,424,563 A | * | 1/1984 | Lynch | 712/241 |
| 5,142,635 A | * | 8/1992 | Saini | 712/225 |
| 5,255,382 A | * | 10/1993 | Pawloski | 711/2 |
| 5,287,309 A | * | 2/1994 | Kai | 365/189.04 |
| 5,491,826 A | * | 2/1996 | Koino | 711/5 |
| 6,167,488 A | * | 12/2000 | Koppala | 711/132 |

* cited by examiner

*Primary Examiner*—Gautam R. Patel
(74) *Attorney, Agent, or Firm*—F. Chau & Associates, LLC

(57) ABSTRACT

A digital data processor comprising a stack storage having a plurality of locations classified into two or more banks, and a stack pointer circuit pointing to one or more stack banks of the stack storage. The stack pointer circuit operates in response to decoding signals from an instruction decoder which decodes a current instruction to determine whether a one-word or a multi-word stack operation is desired.

17 Claims, 10 Drawing Sheets

<One Word Pop>

<Two Word Pop>

Fig. 7A

<Even Address>

| Stack Pointer \ Instruction | BSP1 | BSP2 | MSP<n:1> | MSP<0> |
|---|---|---|---|---|
| 1-Word Push | MPS<n:1> | – | MSP<n:1> | Toggled |
| 2-Word Push | MPS<n:1> | MSP<n:1> | MSP<n:1>+1 | – |
| 1-Word Pop | – | MSP<n:1>–1 | MSP<n:1>–1 | Toggled |
| 2-Word Pop | MPS<n:1>–1 | MSP<n:1>–1 | MSP<n:1>–1 | – |

Fig. 7B

<Odd Address>

| Stack Pointer \ Instruction | BSP1 | BSP2 | MSP<n:1> | MSP<0> |
|---|---|---|---|---|
| 1-Word Push | – | MSP<n:1> | MPS<n:1>+1 | Toggled |
| 2-Word Push | MPS<n:1>+1 | MSP<n:1> | MPS<n:1>+1 | – |
| 1-Word Pop | MPS<n:1> | – | MPS<n:1> | Toggled |
| 2-Word Pop | MPS<n:1> | MSP<n:1>–1 | MPS<n:1>–1 | – |

APPARATUS FOR CONTROLLING MULTI-WORD STACK OPERATIONS USING A MULTI-BANK STACK IN DIGITAL DATA PROCESSORS

BACKGROUND

1. Technical Field

The present invention relates generally to micro-architecture design of digital data processors and, more particularly, to an apparatus for controlling a multibank stack storage device embedded in a digital data processor.

2. Description of Related Art

Many conventional programmable digital data processors, such as microcontroller units (MCUs) and digital signal processors (DSPs), use stack-based instruction sets. A data stack is a storage device that stores information in such a manner that the last stored information item is the first item retrieved, i.e., a stack is accessed in a Last-In, First-Out (LIFO) fashion.

In general, two operations of a stack are the insertion and deletion of stack items. When a new item is inserted to the stack, it is said to be "pushed" onto the stack. Conversely, when an item is deleted from the stack, it is said to be "popped" off the stack. The stack may store program data such as operands or their results, or address pointers, subroutine parameters, and register contents for either subroutine calls and returns or interrupt acknowledges and returns. All "push" and "pop" operations are performed by utilizing the top of the stack. In other words, the top of stack (TOS) is the memory location that is normally read or written. The register that holds the address for the stack is called a stack pointer (SP). This pointer indicates the location of the top of the stack.

In a system (e.g., a computer) having a digital data processor chip, a stack may exist as a stand-alone unit or may be implemented in a random access memory (RAM) unit attached to the processor chip. This stack is organized from a software point of view, and is generally called a "software" stack (sometimes called a "memory" stack). Also, a stack can be organized as a collection of a finite number of registers embedded within a digital processor chip. This type of stack is called a "hardware" stack (sometimes called a "register stack").

The software stack is convenient to use because it allows a user to adjust the stack to a desired size. But, its structure is disadvantageous in view of operating speed and power dissipation since it is required to access external units. On the other hand, the embedded hardware stack structure is suitable for meeting the higher stack operation requirements, for example, a context switching (in which all the contents of several internal registers of the processor chip are saved on the stack for a short time). Also, the hardware stack requires low power consumption because there is no need for accessing any external unit such as a memory. Consequently, such stack-embedded processors have been used for small battery-powered systems having low power consumption requirements, such as mobile telephones. The drawback of the embedded stack is that users cannot change its size.

FIG. 1 shows the organization of a conventional hardware stack. Referring to FIG. 1, the stack 10 has the storage capacity of 32 words. The stack pointer (SP) 20 contains a binary number whose value is equal to "the current stack top word address ($A_{TOS}$)+1". For a stack that can store 32 words, the stack pointer 20 should contain 5 bits since $2^5$=32. A stack pointer 20 having five bits cannot exceed a number greater than 31 ('11111' in binary).

As illustrated in FIG. 1, five items are placed in the 32-word stack 10: A, B, C, D, and E in the order shown. With item E on top of the stack, the content of the stack pointer 20 is 5 (i.e., '00101' in binary). To insert a new item, the stack storage 10 is "pushed" by storing the new item into the location indicated by the stack pointer 20 (i.e., the location at address '5') and then incrementing the stack pointer 20 so as to point to the next-higher order location at address '6'. For removal of the top item E at address '4', the stack storage 10 is "popped" by decrementing the content of the stack pointer 20 first and then retrieving the top item E from the location at address '4', so that the stack pointer 20 contains '4' to indicate the top location.

Typically, digital data processors are categorized in terms of the number of binary bits in the data they process, i.e., their word length. For example, an 8-bit processor to process information by 8 bits (1 byte) has an 8-bit wide stack, hence only one word (i.e., 8 bits) is able to be pushed onto the stack at a time.

A digital processor will generally be designed to have its address bit width larger than its data bit width in order to acquire an adequate amount of memory address space. For example, an 8-bit processor may have its address being 16 bits or more in size even though its data word is only 8-bit wide. In such a case, to push or pop a 16-bit address (e.g., for a subroutine call or return operation) onto or off an 8-bit stack, the 16-bit address should be first divided into two 8-bit portions, and then the two portions are pushed/popped on/off the stack in twice, which causes degradation in processor performance. Accordingly, a digital processor that provides improved performance of stack-based operations is desired.

SUMMARY OF THE INVENTION

The present invention is directed to an improved hardware stack for digital data processors. In one aspect of the present invention, a hardware stack comprises an instruction decoder generating a plurality of decoding signals, each of the plurality of decoding signals denoting one of a plurality of stack operations, a stack storage comprising a plurality of storage locations, each of the plurality of storage location being classified into one of at least two banks, and a stack pointer circuit for pointing to at least one of the stack banks of the stack storage in response to at least one decoding signal to thereby cause a stack operation.

In another aspect of the present invention, a digital data processor comprises a stack storage having a plurality of locations each accommodating a one-word item only, and a stack pointer circuit that points to one or more locations of the stack storage at a one time. The locations of the stack storage is classified into two or more banks. In addition, an instruction decoder is provided for decoding an instruction and generating a plurality of decoding signals which denote a one-word stack operation or multi-word stack operations. The stack pointer circuit points to one or more stack banks at a time in response to the decoding signals such that a one-word item or a multi-word item can be pushed into or popped from the stack banks at a time.

According to yet another aspect of the present invention, a digital processor preferably comprises a stack storage having two banks, a stack pointer for the stack storage, and a stack storage control circuit which inserts and removes either a one-word item or a two-word item into and from the stack storage at a time on the basis of a content of the stack pointer. The two-word item is inserted into and removed from two adjacent locations of the stack storage at a time.

The stack storage control circuit increases or decreases the content of the stack pointer by one when the decoding signals indicate a one-word stack operation. Additionally, the stack storage control circuit increases or decreases the content of the stack pointer by two when the decoding signals indicate a two-word stack operation.

According to another aspect of the present invention, the digital data processor comprises a main stack pointer, first and second stack pointers, and a stack pointer control logic circuit. The main stack pointer, the first and second stack pointers are provided for pointing to one of the locations of the stack storage, to one of the locations of the first bank, and to one of the locations of the second bank, respectively. The instruction decoder decodes a stack-based instruction and generates a plurality of decoding signals which denote one-word push, one-word pop, two-word push and two-word pop operations. The stack pointer control logic circuit controls the first and second bank stack pointers in response to the decoding signals such that a one-word item or a two-word item is inserted into and removed from the stack storage at a time on the basis of a content of the main stack pointer. The first and second banks preferably have the same size. One of the first and second banks includes the locations whose addresses have least significant bits of 0's and the other of the first and second banks includes the locations whose addresses have least significant bits of 1's.

These and other aspects, features and advantages of the present invention will be described and become apparent from the following detailed description of preferred embodiments, which is to be read in connection with the accompanying drawings in which like reference symbols indicate the same or similar components.

BRIEF DESCRIPTION OF THE DRAWINGS

FIGS. 7A and 7B are tables showing content variations of the stack pointers of FIG. 6 in accordance with stack instructions and content of the main stack pointer.

DETAILED DESCRIPTION OF PREFERRED EMBODIMENTS

The present invention relates to an improved hardware stack for digital data processors. In order to provide a thorough understanding of the present invention, the common architecture of digital data processors will be explained before the description of the preferred embodiments.

A digital data processor typically contains an arithmetic and logic unit (ALU), a set of registers (or register file), and a control unit (CU). These three sections are connected through internal buses.

One function of the ALU is to perform arithmetic operations such as add, subtract, multiply and divide on operands presented to it by the CU. Another function of the ALU is to perform boolean operations, such as NOT, AND, OR, and EXclusive-OR. Other operations performed by the ALU include clear, increment, rotate and shift in both arithmetic and logic form.

The register set includes both general- and special-purpose types, as is well known to those skilled in the art. One special register is the program counter (PC) which points to the memory location where the next sequential instruction is to be found. This register is automatically updated following the execution of the current instruction unless the current instruction is a branch or jump. Another special register is the instruction register (IR) which temporarily stores instructions that are fetched from memory. The stack pointer (SP) is a special register which holds the address of a stack unit for the temporary storage of variables. Additionally, an accumulator (ACC) and status register (SR) are used for special purposes. The ACC holds data fetched from memory, passes this data onto the ALU for some calculation, receives results back from the ALU and then passes these results back to memory. The ALU operations affect flag bits in the SR. These bits can be subsequently used to test for conditional jumps, which are taken depending on whether a carry, overflow, negative or zero result was obtained.

Typically, program execution in a digital data processor involves such steps as repeatedly fetching, decoding and executing these instructions, one at a time. An instruction fetch involves loading the IR with the contents of a particular memory location, followed by incrementing the PC to the next sequential location unless the current instruction is a branch or jump. Instructions fetched from memory are passed via the IR to the instruction decoder for decoding and subsequent execution. The instruction decoder determines what operation needs to be performed. The CU carries out the decoded instruction by selecting the appropriate combination of individual control lines.

Figure 1:
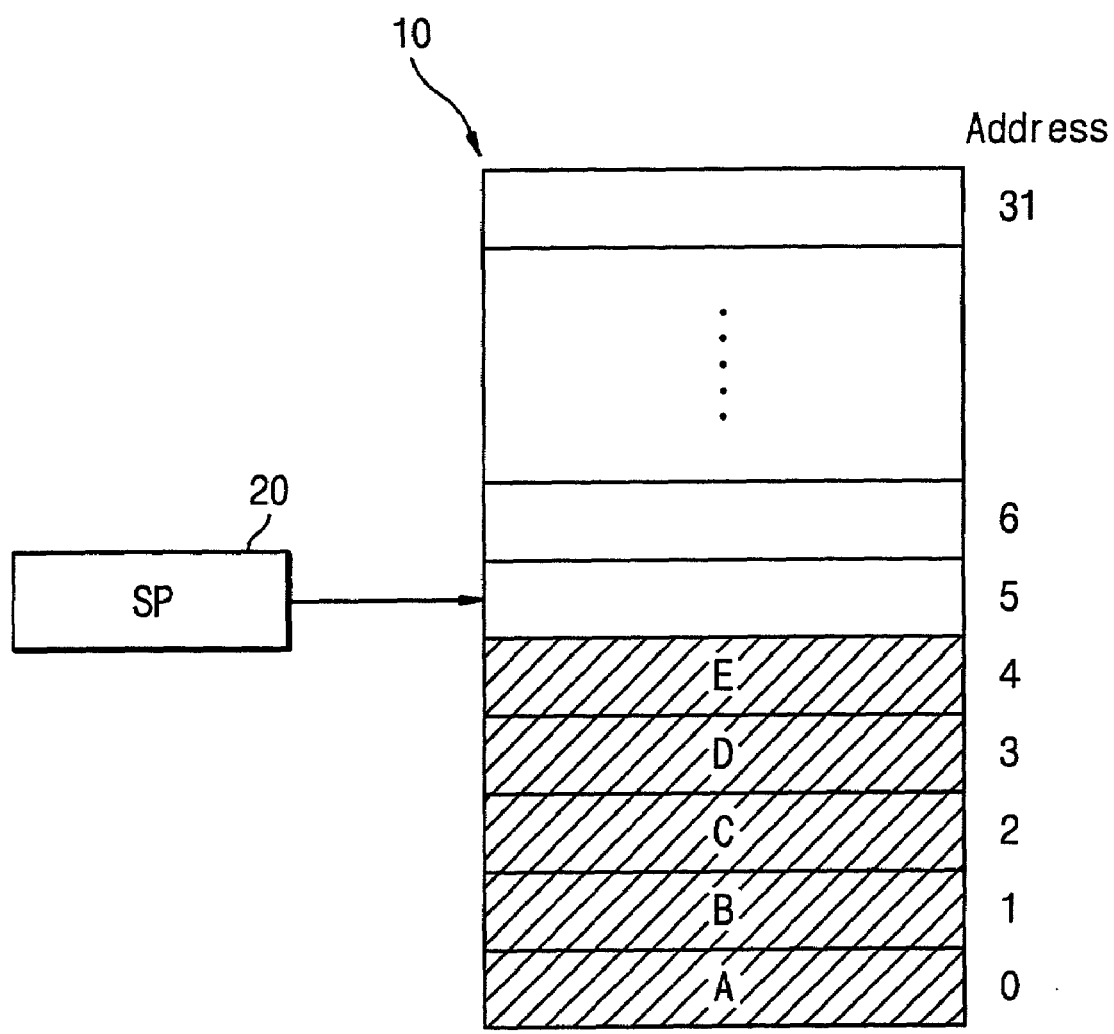
FIG. 1 is a schematic diagram illustrating a conventional hardware stack architecture for digital processors.
Figure 2:
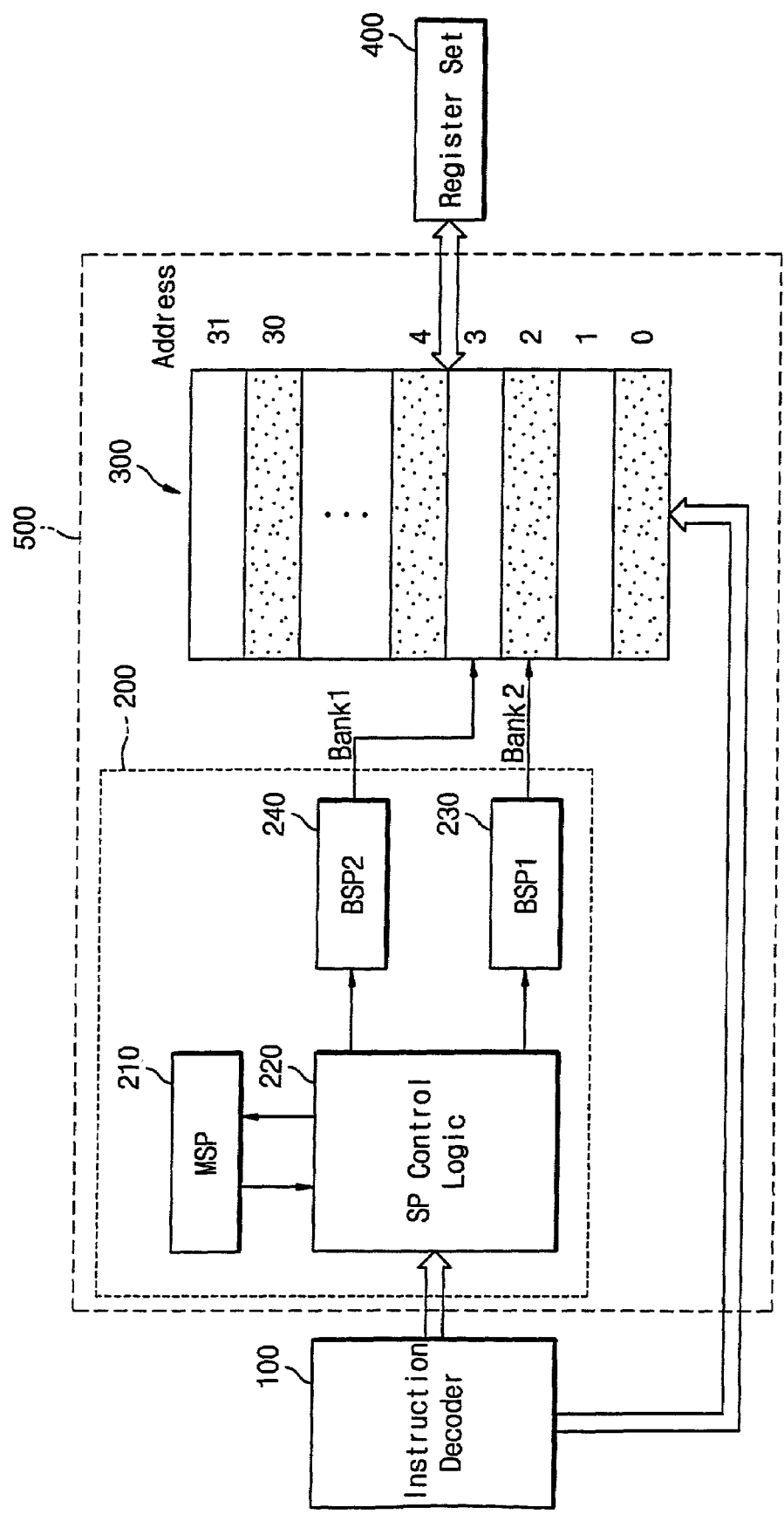
FIG. 2 is a block diagram illustrating a hardware stack according to a preferred embodiment of the present invention.

Preferred embodiments of the present invention will now be described in detail with reference to the accompanying drawings. Reference is made first to FIG. 2, which illustrates an architecture of a hardware stack device 500 according to a preferred embodiment of the invention. The stack device 500 is intended to be incorporated within a programmable digital data processor, such as a microprocessor, a microcontroller unit, or a digital signal processor.

Referring to FIG. 2, the stack device 500 is connected with a register set 400 to provide a temporary storage for the register set 400. The stack device 500 comprises a stack pointer circuit 200 and a stack storage 300. The stack storage 300 is subdivided into two banks BANK0 and BANK1. The first stack bank BANK0 comprises stack locations whose least significant bits (LSBs) of addresses are 0's and the second stack bank BANK1 comprises other locations whose LSBs of addresses are 1's. The stack pointer circuit 200 comprises a main stack pointer (MSP) 210 of n+1 bits, two n bit-wide bank stack pointers (BSPs) 230 and 240 for pointing to the tops of the stack banks BANK0 and BANK1, respectively, and a stack pointer control logic circuit 220 for controlling the stack pointers 210, 230 and 240, where 'n' is a positive integer. The main stack pointer (sometimes called a user stack pointer) 210 is designed to contain a binary number whose value equals "the top word address ($A_{TOS}$)+1". A stack storage control circuit, comprising the first and second bank stack pointers 230, 240 and the stack pointer control circuit 220, inserts and removes either a one-word item or a two-word item into and from the stack storage 300 at a time on the basis of a content of the main stack pointer 210 in response to a plurality of decoding signals from an instruction decoder 100.

Figure 3:
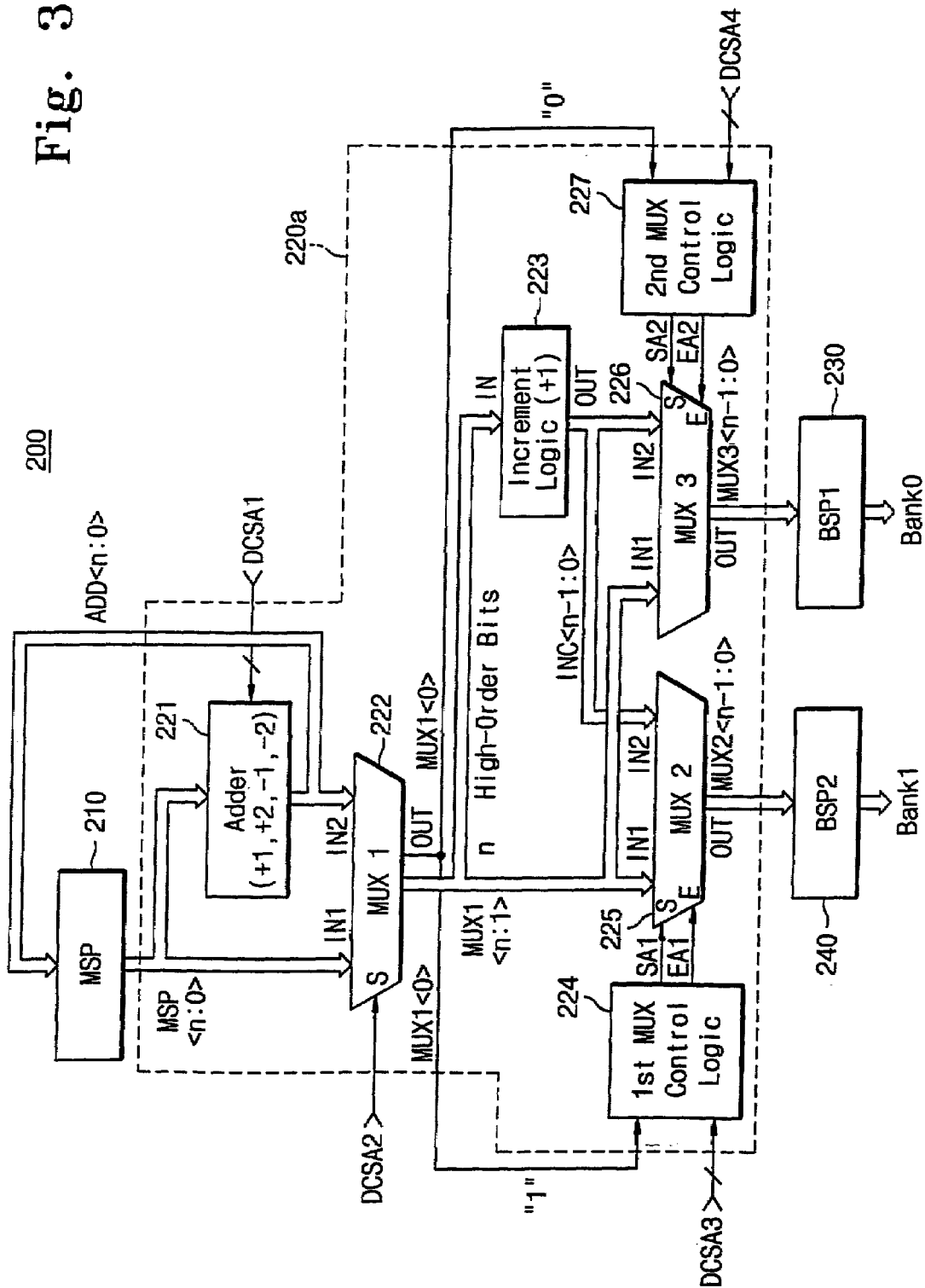
FIG. 3 is a high level block diagram illustrating a detailed circuit configuration of a stack pointer circuit according to an embodiment of the present invention.

FIG. 3 is a high level block diagram illustrating a detailed circuit configuration of a stack pointer circuit 200 according to an embodiment of the present invention. Referring to FIG. 3, the stack pointer circuit 200 comprises a stack pointer control logic circuit 220a for controlling the stack pointers 210, 230 and 240, which comprises an adder 221, first, second, and third multiplexers (MUXs) 222, 225 and 226 serving as selectors, an increment logic circuit 223, and first and second MUX control logic circuits 224 and 227. The multiplexers 222, 225 and 226 are preferably 2×1 multiplexers, each having two inputs IN 1, IN2 and an output OUT. The characters 'S' and 'E' for each of the multiplexers 222, 225 and 226 denote a select terminal and an enable terminal, respectively.

The adder 221 adds '+1', '+2', '−1', or '−2' to the content MSP<n:0> of the main stack pointer 210 in response to a first instruction decoding signal DCSA1 from the instruction decoder 100, which indicates the types of stack-based instructions. Specifically, if the first instruction decoding signal DCSA1 indicates a one-word (i.e., 8-bit) push operation, the adder 221 adds '+1' and the content MSP<n:0> of the stack pointer 210. If the first instruction decoding signal DCSA1 indicates a one-word pop operation, the adder 221 adds '−1' to the content MSP<n:0>. For a two-word (i.e., 16-bit) push operation, '+2' is added to the content MSP<n:0>; and for a two-word pop instruction, '−2' is added.

The first multiplexer 222 selects one of the content MSP<n:0> of the main stack pointer 210 and the content ADD<n:0> of the adder 221 in response to a second instruction decoding signal DCSA2 provided from the instruction decoder 100, which functions as a "select" control signal for the first multiplexer 222. Specifically, when the instruction decoder 100 indicates a push operation by generating a second instruction decoding signal DCSA2 of logic '0', the first multiplexer 222 selects the output MSP<n:0> of the main stack pointer 210. Thereafter, the main stack pointer 210 is updated by the resultant content ADD<n:0> of the adder 221. On the other hand, when the instruction decoder 100 indicates a pop operation by generating an instruction decoding signal DCSA2 of logic '1', the first multiplexer 222 selects the output ADD<n:0> of the adder 221, and then the main stack pointer 210 is also updated by the resultant value ADD<n:0> of the adder 221.

For the sole purpose of illustration, and by way of example with reference to FIG. 2, the stack storage 300 is assumed to have the storage capacity of 32 words, with each of the stack banks BANK0 and BANK1 having the storage capacity of 16 words. With this example, the main stack pointer 210 is assumed to contain 5 bits of MSP<4:0> (since $2^5=32$) and each of the bank stack pointers 230 and 240 is assumed to be 4-bit wide (since $2^4=16$). In addition, it is assumed that (1) the stack pointer circuit 200 of the invention is incorporated within an 8-bit processor intended to process 8-bit data (1-byte-wide); (2) the stack storage 300 is 8-bit wide; and (3) the 8-bit processor is loaded with 8- (single- or one-word) or 16-bit (double- or two-word) wide stack items. An example of the 16-bit items (i.e., two-word items) includes an address stored in the program counter (PC).

Of the five bits MUX1<4:0> output from the first multiplexer 222, the least significant bit MUX1<0> is applied to first and second MUX control logics 224 and 227, and the remaining four high-order bits MUX1<4:1> output from the first multiplexer 222 are provided to an increment logic circuit 223. The MUX1<4:1> are also provided to first inputs IN1 of the respective second and third multiplexers 225 and 226.

The increment logic circuit 223 increments the MUX1<4:1> (which is output from the first multiplexer 222) by 1. The content INC<3:0> output from the increment logic circuit 223 is provided to the second inputs IN2 of the respective multiplexers 225 and 226, each of which selects one of the MSP<4:1> from the first multiplexer 222 and the output INC<3:0> of the increment logic circuit 223 in response to the corresponding select control signal SA1 or SA2. The output MUX2<3:0> of the second multiplexer 225 is provided to the second bank stack pointer 240, while the output MUX3<3:0> of the third multiplexer 226 is provided to the first bank stack pointer 230.

The first MUX control logic circuit 224 receives the MUX 1<0> from the first multiplexer 222 and a third instruction decoding signal DCSA3 from the instruction decoder 100, and generates a first MUX enable signal EA1 and a select control signal SA1 for the second multiplexer 225. The second MUX control logic circuit 227 receives the MUX1<0> from the first multiplexer 222 and a fourth instruction decoding signal DCSA4 from the instruction decoder 100, and generates a second MUX enable signal EA2 and a select control signal SA2 for the third multiplexer 226.

When the MUX1<0> is logic '1' and the decoding signals DCSA3 and DCSA 4 indicate a one-word operation, the first MUX control logic circuit 224 enables the second multiplexer 225, while the second MUX control logic circuit 227 disables the third multiplexer 226. Conversely, when the MUX1<0> is logic '0' and the decoding signals DCSA3 and DCSA 4 indicate a one-word operation, the first MUX control logic circuit 224 disables the second multiplexer 225 while the second MUX control logic circuit 227 enables the third multiplexer 226. In short, during a one-word operation, either of the first and second MUX control logic circuits 224 and 227 generates the respective select control signals SA1 or SA2 of logic '0', so that the second or third multiplexer 225 and 226 selects the MUX1<4:1> from the first multiplexer 222.

On the other hand, when the instruction decoding signals DCSA3 and DCSA4 indicate a two-word operation, the second and third multiplexers 225 and 226 both are enabled by the first and second MUX control logic circuits 224 and 227, respectively, regardless of the logic state of the MUX1<0>.

Additionally, if the MUX1<0> is logic '0' during the two-word operation, then the first and second MUX control logic circuits 224 and 227 generate a select control signal SA1 of logic '1' and a select control signal SA2 of logic '0', respectively, so that the second multiplexer 225 selects the output INC<3:0> of the increment logic circuit 223 and the third multiplexer 226 selects the MUX1<4:1> from the first multiplexer 222. In contrast, if the MUX1<0>is logic '1' during the two-word operation, then the first and second MUX control logic circuits 224 and 227 generate a select control signal SA1 of logic '0' and the select control signal SA2 of logic '1', respectively, so that the second multiplexer 225 selects the MUX1<4:1> from the first multiplexer 222 and the third multiplexer 226 selects the output INC<3:0> of the increment logic circuit 223.

Hereinafter, various modes of operation of the stack pointer circuit 200 of FIG. 3 will be explained with reference to FIGS. 4A through 5E, wherein the numbers within the respective blocks (i.e., locations) of the two banks BANK0 and BANK1 represent the addresses of the stack storage 300; the numbers outside the blocks represent the bank addresses of the corresponding bank; the dashed blocks represent the locations having items; the bold box represents the result of a push operation; and the dashed box represents the result of a pop operation.

Figure 4A:
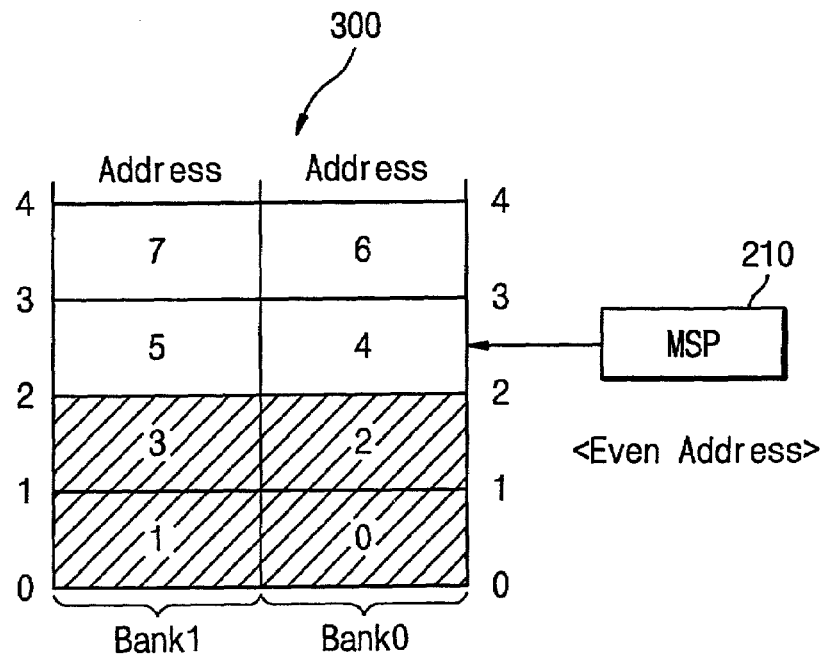
FIGS. 4A through 5E are schematic views which illustrate methods of operation of the stack pointer circuit according to the present invention.

FIG. 4A illustrates a situation where the main stack pointer 210 points to the location at an even address '4' (='00100' in binary) of the stack storage 300, i.e., a bank address '2' (='0010' in binary) of the first bank BANK0. FIGS. 4B through 4E illustrate the results of a one-word push, a two-word push, a one-word pop, and a two-word pop operation, respectively, based on the example shown in FIG. 4A. Each of these stack operations will now be described in further detail.

Figure 4B:
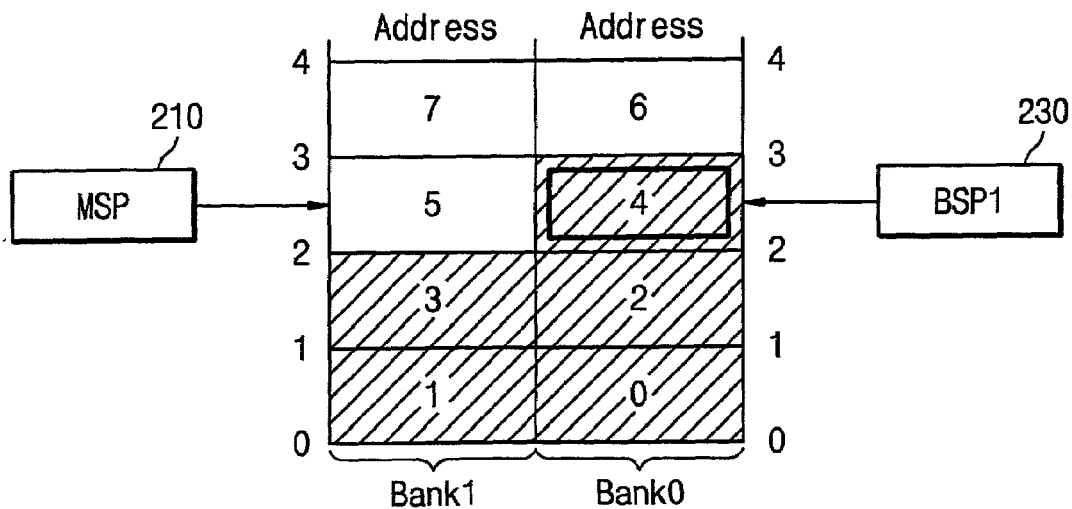

To begin, referring now to FIG. 3 and FIG. 4B, during a one-word push (e.g., 8-bit push) operation, the stack pointer circuit 200 of FIG. 3 operates as follows. The adder 221 adds '+1' to the content of the main stack pointer 210 in response to the instruction decoding signal DCSA1 from the instruction decoder 100. The first multiplexer 222 selects the content ('00100') of the main stack pointer 210 in response to the instruction decoding signal DCSA2 from instruction decoder 100. Since the MUX1<0> (output from the first multiplexer 222) is logic '0', the second multiplexer 225 is disabled by the first MUX control logic circuit 224 in response to the instruction decoding signal DCSA3 from the instruction decoder 100, whereas the third multiplexer 226 is enabled by the second MUX control logic circuit 227 in response to the instruction decoding signal DCSA4 from the instruction decoder 100. The third multiplexer 226 selects the MUX1<4:1> of '0010' (=2) in response to the select control signal SA2 from the second MUX control logic circuit 227. As a result, the first bank stack pointer 230 contains a bank address of '2'. Accordingly, a new one-word stack item from the register set 400 is stored in the location at the bank address '2' of the first bank BANK0, i.e., at the address '4' of the stack storage 300. Finally, the main stack pointer 210 is updated by the content ('5') of the adder 221, so that the pointer 210 points to the next location at address '5' of stack storage 300.

Figure 4C:
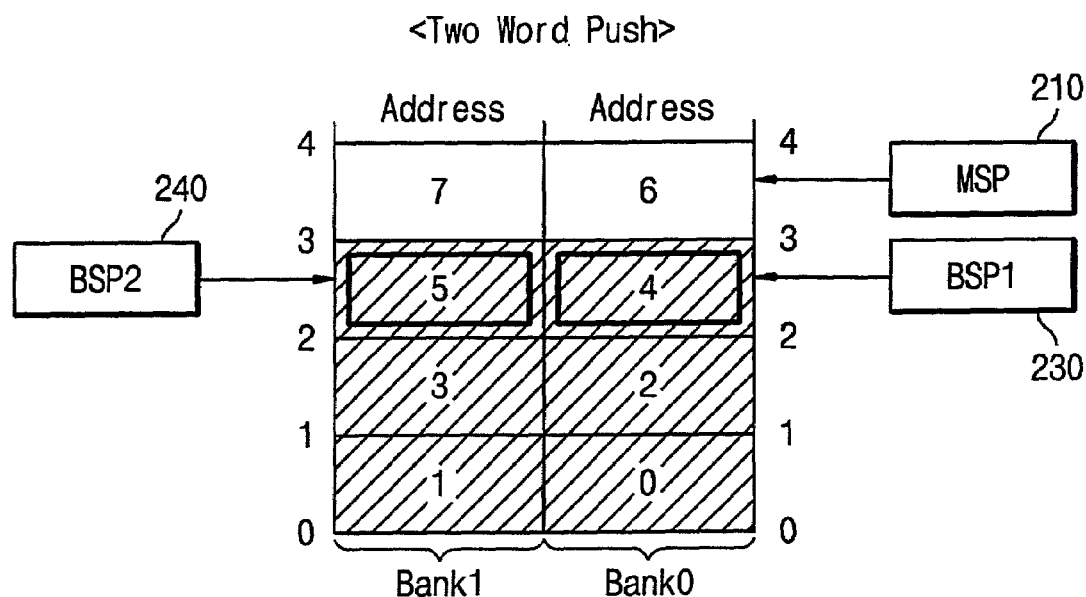

Next, during a two-word push operation (e.g., 16-bit push), the first multiplexer 222 also selects the content ('00100') of the main stack pointer 210 in response to the instruction decoding signal DCSA2. Both the second and third multiplexers 225, 226 are enabled independent of the LSB MUX1<0> (which is output from the first multiplexer 222) because of the two-word operation. The second and third multiplexers 225, 226 both select the MUX1<4:1> ('0010') in response to the respective select control signals SA1 and SA2, so that the bank stack pointers 230 and 240 each contain the same bank address of '2'. Accordingly, a new two-word stack item from the register set 400 is stored in the locations at the bank addresses '2s' of the respective banks BANK0 and BANK1, i.e., at the addresses '4' and '5' of the stack storage 300. In this operation, the adder 221 adds '+2' to the content ('4') of the main stack pointer 210 and the main stack pointer 210 is updated by the content of the adder 221, allowing the pointer 210 to point to the next location at address '6' of stack storage 300 as shown in FIG. 4C.

Figure 4D:
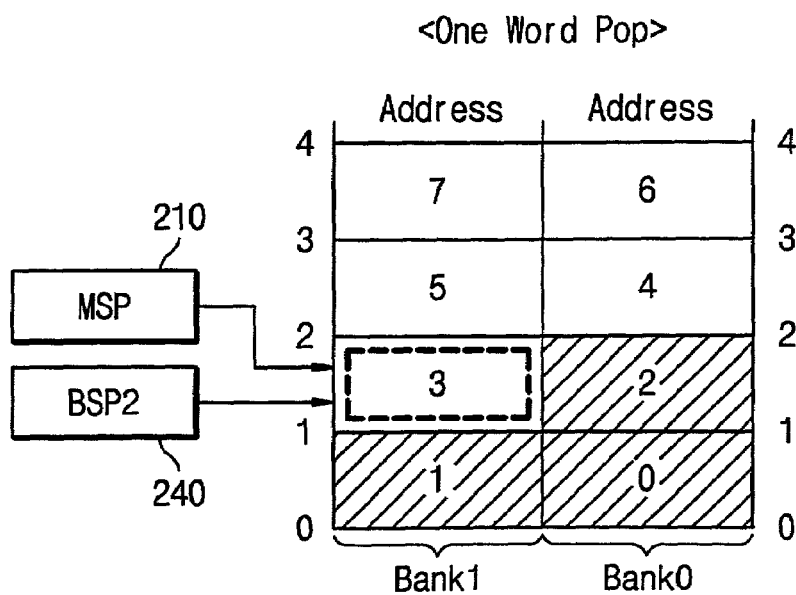

Next, with the one-word pop operation, the adder 221 adds '−1' to the content ('4') of the main stack pointer 210. The first multiplexer 222 selects the content ('00011') of the adder 221 in response to the instruction decoding signal DCSA2. Since the MUX1<0> is logic '1', the second multiplexer 225 is enabled while the third multiplexer 226 is disabled. The second multiplexer 225 selects the MUX1<4:1> of '0001' in response to the select control signal SA1 from the first MUX control logic circuit 224. As a result, the second bank stack pointer 240 contains a bank address of '1'. Accordingly, the one-word item is removed from the location at the bank address '1' of the second bank BANK1, i.e., at the address '3' of the stack storage 300. Finally, the main stack pointer 210 is updated by the content ('3') of the adder 221, so that the pointer 210 points to the top location at address '3' of stack storage 300 as illustrated in FIG. 4D.

Figure 4E:
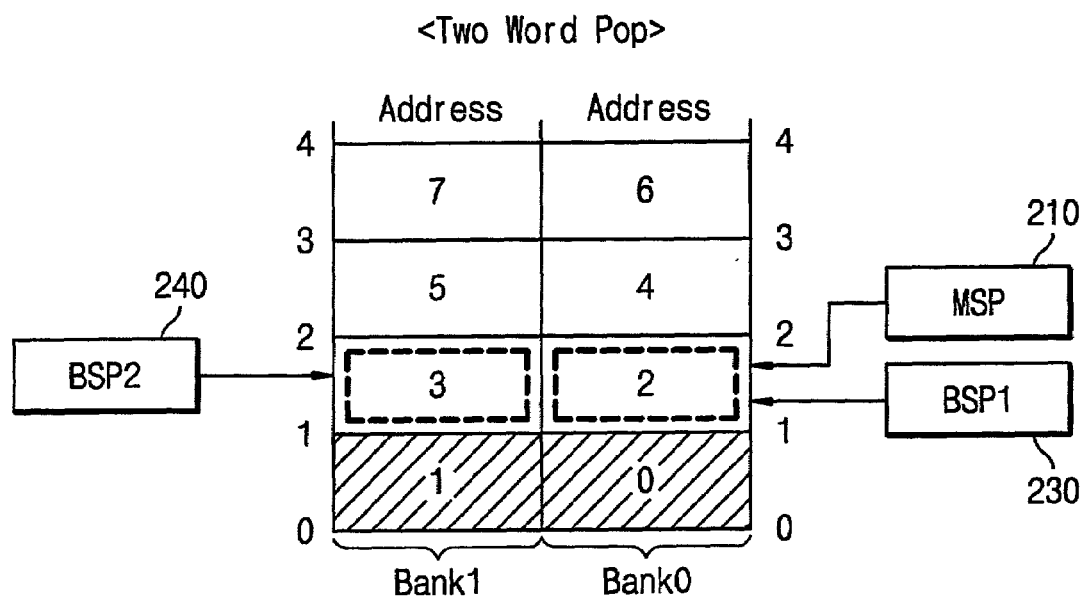

Next, during a two-word pop operation, the adder 221 adds '−2' to the content ('4') of the main stack pointer 210, so that the adder 221 contains '2'. The first multiplexer 222 selects the content ('00010') of the adder 221 in response to the instruction decoding signal DCSA2. In this operation, both the second and third multiplexers 225, 226 are enabled. The second and third multiplexers 225, 226 each select MUX1<4:1> of '0001' from the first multiplexer 222 in response to the respective select control signals SA1 and SA2, so that the bank stack pointers 230 and 240 each contain the same bank address of '1'. Accordingly, the two-word item is deleted from the locations at the bank addresses '1s' of the respective banks BANK0 and BANK1, i.e., at the addresses '2' and '3' of the stack storage 300. The main stack pointer 210 is also updated by the content ('2') of the adder 221, allowing the pointer 210 to point to the top location at address '2' of stack storage 300 as shown in FIG. 4E.

Figure 5A:
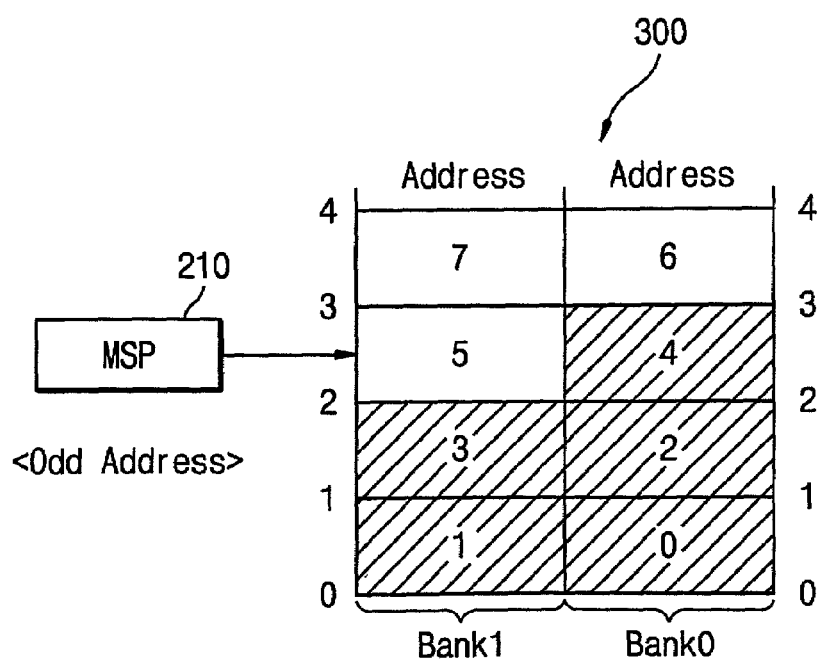

FIG. 5A illustrates the situation where the main stack pointer 210 points to the location at an odd address '5' (='00101') of the stack storage 300, i.e., a bank address '2' (='0010') of the second bank BANK1. FIGS. 5B through 5E illustrate results of a one-word push, a two-word push, a one-word pop, and a two-word pop operation, respectively, based on the example shown in FIG. 5A. Each of these stack operations will now be described in further detail.

Figure 5B:
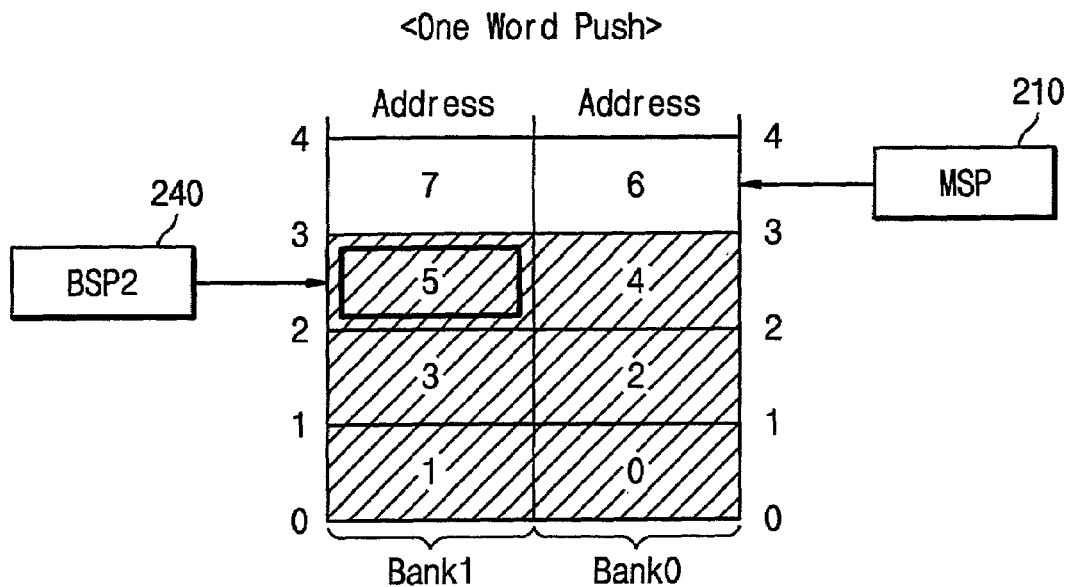

To begin, during a one-word push operation, the first multiplexer 222 selects the content ('00101') of the main stack pointer 210 in response to the instruction decoding signal DCSA2. The second and third multiplexer 225 and 226 are enabled and disabled, respectively, because the MUX1<0> is '1'. The second multiplexer 225 selects the MUX1<4:1> of '0010' in response to the select control signal SA1 from the first MUX control logic circuit 224. As a result, the second bank stack pointer 240 contains a bank address of '2'. Accordingly, a new one-word item is stored in the location at the bank address '2' of the second bank BANK1, i.e., at the address '5' of the stack storage 300. The adder 221 adds '+1' to the content ('5') of the main stack pointer 210, and the main stack pointer 210 is updated by the content ('6') of the adder 221, so that the pointer 210 points to the next location at address '6' of stack storage 300 as illustrated in FIG. 5B.

Figure 5C:
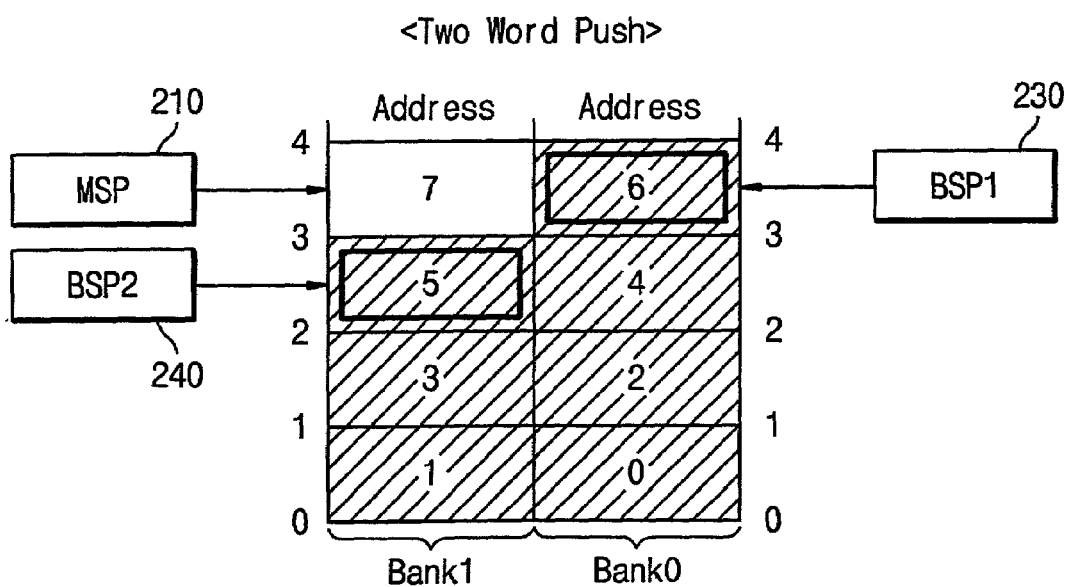

Next, during a two-word push operation, the first multiplexer 222 selects the content ('00101'=5) of the main stack pointer 210 in response to the instruction decoding signal DCSA2. The second and third multiplexers 225, 226 are both enabled because of two-word operation. The increment logic circuit 223 increases the MUX1<4:1> of '0010' by one. The second multiplexer 225 selects the MUX1<4:1> of '2' in response to the select control signal SA1 from the first MUX control logic circuit 224 and the third multiplexer 226 selects the content ('0011') of the increment logic circuit 223 in response to the select control signal SA2 from the second MUX control logic circuit 227. As a result, the first bank stack pointer 230 contains a bank address of '0011' (=3) and the second bank stack pointer 240 contains a bank address of '0010' (=2). Accordingly, a new two-word item is inserted into the locations at the bank addresses '2' and '3' of the respective banks BANK1 and BANK0, i.e., at the addresses '5' and '6' of the stack storage 300. In this operation, the adder 221 adds '+2' to the content ('5') of the main stack pointer 210 and the main stack pointer 210 is updated by the content of the adder 221, allowing the pointer 210 points to the next location at address '7' of stack storage 300 as shown in FIG. 5C.

Figure 5D:
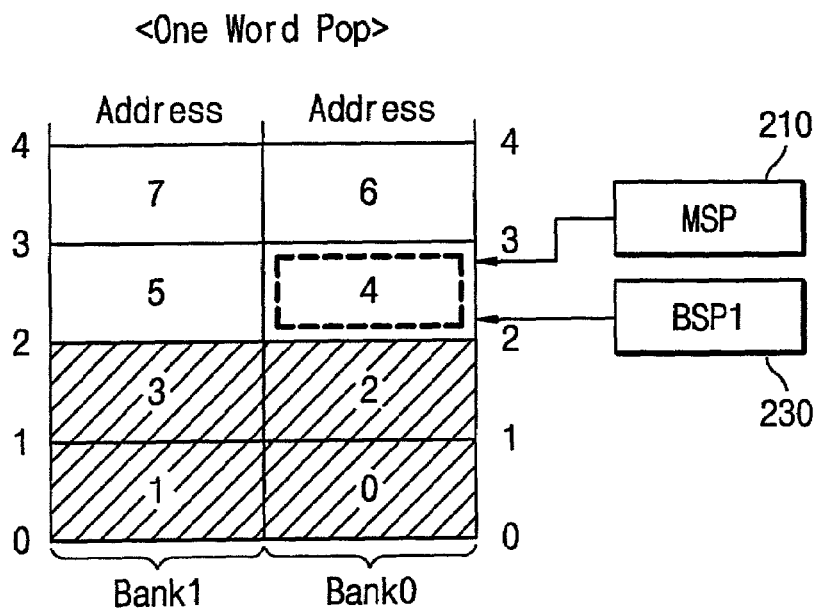

Next, during a one-word pop operation, the adder 221 adds '−1' to the content ('5') of the main stack pointer 210. The first multiplexer 222 selects the content ('00100'=4) of the adder 221 in response to the instruction decoding signal DCSA2. Since the MUX1<0> is '0', the third multiplexer 226 is enabled while the second multiplexer 225 is disabled. The third multiplexer 226 selects the MUX1<4:1> of '0010' in response to the select control signal SA1. As a result, the first bank stack pointer 230 contains a bank address of '2'. Accordingly, the one-word item is removed from the location at the bank address '2' of the first bank BANK0, i.e., at the address '4' of the stack storage 300. Thereafter, the main stack pointer 210 is updated by the content ('4') of the adder 221, so that the pointer 210 points to the top location at address '3' of stack storage 300 as illustrated in FIG. 5D.

Figure 5E:
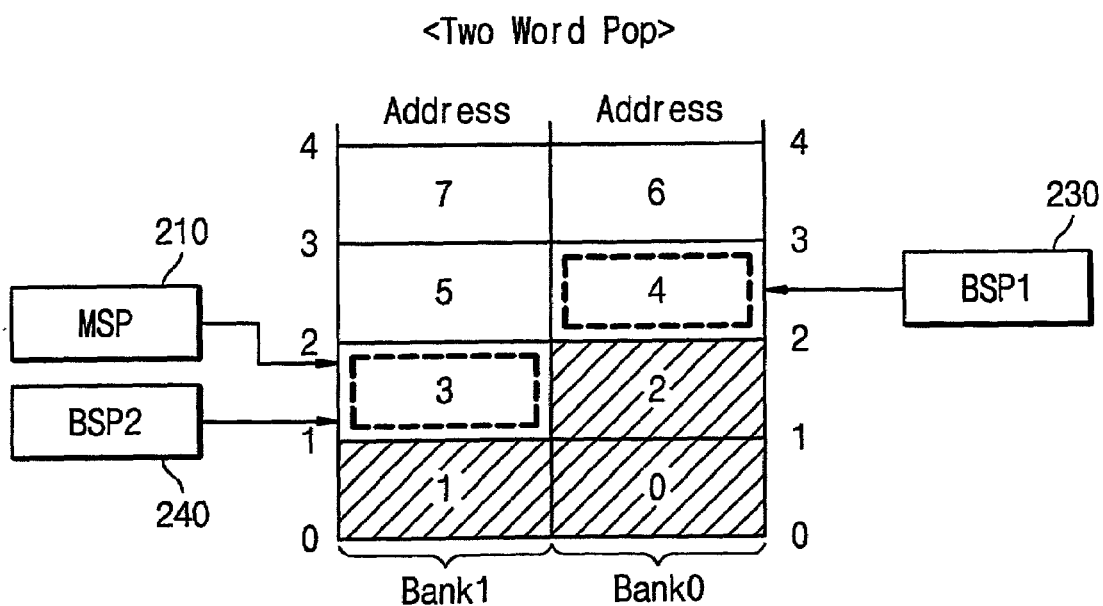

Next, during a two-word pop operation, the adder 221 adds '−2' to the content ('5') of the main stack pointer 210 in response to the instruction decoding signal DCSA1 and contains '3'. The first multiplexer 222 selects the content ('00011'=3) of the adder 221 in response to the instruction decoding signal DCSA2. The increment logic circuit 223 increases the MUX1<4:1> of '0001' by one. The second and third multiplexers 225, 226 are both enabled in this operation. The second multiplexer 225 selects the MUX1<4:1> in response to the select control signal SA1 and the third multiplexer 226 selects the content ('0010') of the increment logic circuit 223 in response to the select control signal SA2. As a result, the first bank stack pointer 230 contains a bank address of '2' and the second bank stack pointer 240 contains a bank address of '1'. Accordingly, the two-word item is removed from the locations at the bank addresses '2' and '1' of the respective banks BANK0 and BANK1, i.e., at the addresses '4' and '3' of the stack storage 300. Finally, the main stack pointer 210 is updated by the content ('3') of the adder 221, allowing the pointer 210 to point to the top location at address '3' of stack storage 300 as shown in FIG. 5E.

Figure 6:
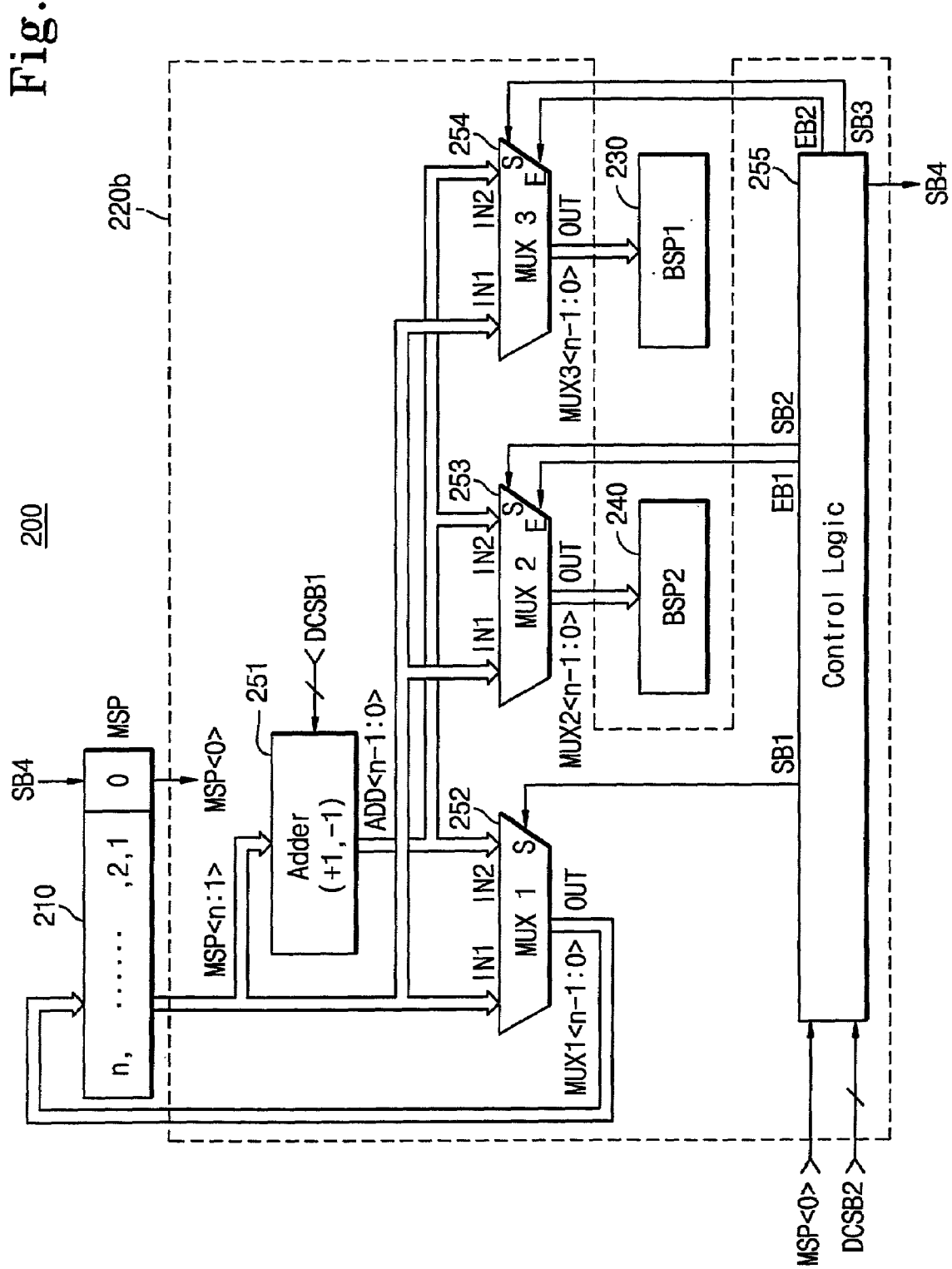
FIG. 6 is a high level block diagram illustrating a stack pointer circuit according to another embodiment of the present invention.

FIG. 6 illustrates a detailed circuit architecture of a stack pointer circuit 200 of FIG. 2 according to another embodiment of the invention. Referring to FIG. 6, the stack pointer circuit 200 comprises a stack pointer control logic circuit 220b for controlling the stack pointers 210, 230 and 240, which includes an adder 251, three 2×1 multiplexers 252, 253 and 254, and a control logic circuit 255.

The high-order bits MSP<n:1> of the main stack pointer 210 are applied to the adder 221. The adder 221 adds '+1' or '−1' to the MSP<n:1> in response to a instruction decoding signal DCSB1 from the instruction decoder 100, which indicates the types of stack-based instructions. The least significant bit MSP<0> is applied to the control logic circuit 255, along with an instruction decoding signal DCSB2 from the instruction decoder 100, which indicates the types of stack-based instructions. The control logic circuit 255 controls the multiplexers 252–254 and the least significant bit MSP<0> of the main stack pointer 210 in response to the MSP<0> and the instruction decoding signal DCSB2. The multiplexers 253 and 254 are exclusively enabled by MUX enable signals EB1 and EB2 from the control logic circuit 255, respectively, during one-word operations, and are both enabled during two-word operations. The MSP<n:1> is commonly applied to first inputs IN1 of the multiplexers 252–254 and the content ADD<n−1:0> of the adder 251 is applied to second inputs IN2 thereof. The output MUX1<n−1:0> of the first multiplexer 252 is fed back to the main stack pointer 210. The output MUX2<n−1:0> of the multiplexer 253 is provided to the second bank stack pointer 240. The output MUX3<n−1:0> of the multiplexer 254 is provided to the first bank stack pointer 230. The respective multiplexers 252-254 selectively input one of the MSP<n:1> and the ADD<n−1:0> in response to select control signals SB1, SB2 and SB3 from the control logic circuit 255, respectively. The control logic circuit 255 generates a control signal SB4 for toggling the MSP<0>.

FIG. 7A is a table which illustrates content variations of stack pointers of FIG. 6 in accordance with the stack instructions in the situation wherein the main stack pointer contains an even address. FIG. 7B is a table which illustrates content variations of stack pointers of FIG. 6 in accordance with the stack instructions in the situation wherein the main stack pointer contains an odd address.

Various examples of stack operations of the stack pointer circuit 200 of FIG. 6 will now be described with reference to FIGS. 4A–5E, 6, 7A, and 7B. For the purposes of explanation, it is assumed that the main stack pointer 210 contains 5 bits of MSP<4:0> and each of the bank stack pointers 230 and 240 is 4-bit wide.

Referring initially to FIGS. 4A, 6 and 7A, a one-word push (e.g., 8-bit push) operation will now be described based on the above assumption that the main stack pointer 210 points to the location at the even address of '4' (=00100 in binary). With this stack operation, the multiplexer 254 selects the MSP<4:1> of '0010' (=2) in response to the MUX enable signal EB2 and the select control signal SB3 from the control logic circuit 255, whereas the multiplexer 253 is disabled by the MUX enable signal EB1 from the control logic circuit 255, so that the first bank stack pointer 230 contains '2'. Accordingly, a new one-word item is stored in the location at the bank address '2' of the first bank BANK0, i.e., at the address '4' of the stack storage 300. At this time, the multiplexer 252 selects the MSP<4:1> in response to the select control signal SB1 from the control logic circuit 255, and then outputs MUX1<3:0> of '2' which is fed back to the main stack pointer 210. The control logic circuit 255 then generates control signal SB4 to toggle the MSP<0> of logic '0' (refer to FIG. 7A), so that the main stack pointer contains '00101' (=5) as illustrated in FIG. 4B.

Next, during a two-word push (e.g., 16-bit push) operation (assuming as in the above example that the main stack pointer 210 contains the address '4'), the adder 251 adds '+1' to the MSP<4:1> of '2' in response to the instruction decoding signal DCSB1 from the instruction decoder 100. The multiplexers 253 and 254 both are enabled in response to the MUX enable signals EB1 and EB2 from the control logic circuit 255, respectively, and they select the MSP<4:1> of '2', so that the bank stack pointers 230 and 240 each contain the same bank address of '2'. Accordingly, a new two-word item is inserted into the locations at bank addresses '2s' of the respective banks BANK0 and BANK1, i.e., at the addresses '4' and '5' of the stack storage 300. On the other hand, the multiplexer 252 selects the adder's content ADD<3:0> of '0011' (=3) in response to the select control signal SB1. The MUX1<3:0> or ADD<3:0> is naturally provided to the high-order bits MSP<4:1> of the main stack pointer 210 with the least significant bit MSP<0> of logic '0', so that the main stack pointer 210 contains '00110' (=6) as illustrated in FIG. 4C.

Next, during a one-word pop operation (assuming as in the above example that the main stack pointer 210 contains the address '4'), the adder 251 adds '−1' to the MSP<4:1> of '2' and the multiplexer 254 is disabled by the MUX enable signal EB2. The multiplexers 252 and 253 select the content ADD<3:0> of '1' from the adder 251 in response to the select control signals SB1 and SB2, respectively. Accordingly, the bank stack pointer 240 points to the bank address of '1' of the BANK1, i.e., at the address '3' of the stack storage 300, from which the top one-word item is deleted. The MUX1<3:0> of '1' is provided to the MSP<4:1> of the main stack pointer 210 and the MSP<0> is toggled to '1' in response to the control signal SB4 from the control logic circuit 255 (refer to FIG. 7A), so that the main stack pointer 210 contains '00011' (=3) as illustrated in FIG. 4D.

Next, during two-word pop operation (assuming as in the above example that the main stack pointer 210 contains the address '4'), the adder 251 adds '−1' to the MSP<4:1> of '2' in response to the instruction decoding signal DSCB1, and the multiplexer 252 selects the ADD<3:0> of '1' in response to the select control signal SB1. The multiplexers 253 and 254 select the ADD<3:0> of '1' in response to the select control signal SB2 and SB3, respectively. As a result, the first and second bank stack pointers 230 and 240 each contain '1'. Accordingly, the two-word item is removed from the locations at the bank addresses '1s' of the respective banks BANK0 and BANK1, i.e., at the address '2' and '3' of the stack storage 300. The MUX1<3:0> of '1' is provided to the MSP<4:1> of the main stack pointer 210, so that the main stack pointer 210 contains '00010' (=2) as illustrated in FIG. 4E.

Referring to FIGS. 5A through 5E, 6 and 7B, various examples of stack operations will be described under the assumption that the main stack pointer 210 points to the location at the odd address of '5' (=00100) (as illustrated in FIG. 5A). To begin, during a one-word push operation, the adder 251 adds '1' to the MSP<4:1> of '2' in response to the instruction decoding signal DCSB1, and the multiplexer 254 is disabled by the MUX enable signal EB2. The multiplexer 252 selects the ADD<n−1:0> of '3' and outputs MUX1<3:0> in response to the select control signal SB1. In addition, the multiplexer 253 selects the MSP<4:1> of '2' in response to the select control signal SB2, so that the second bank stack pointer 240 contains '2'. Accordingly, a new one-word item is stored in the location at the bank address '2' of the second bank BANK1, i.e., at the address '5' of the stack storage 300. The MUX1<3:0> of '3' is fed back to the main stack pointer 210 and the control logic circuit 255 controls the main stack pointer 210 to toggle the MSP<0> of '1' (refer to FIG. 7B) with the control signal SB4, thereby causing the main stack pointer 210 to point to the location at the address '00110' (=6) of the stack storage 300 as illustrated in FIG. 5B.

Next, during a two-word push operation (assuming as in the above example that the main stack pointer 210 contains '5'), the adder 251 adds '+1' to the MSP<4:1> of '2' in response to the instruction decoding signal DCSB1. The multiplexers 253 and 254 both are enabled in response to the MUX enable signals EB1 and EB2, respectively. The multiplexer 253 selects the MSP<4:1> of '2' in response to the select control signal SB2, so that the second bank stack pointer 240 contains the bank address of '2'. The multiplexer 254 selects the ADD<3:0> of '3' in response to the select control signal SB2, so that the first bank stack pointer 230 contains '3'. Accordingly, a new two-word item is inserted into the locations at bank addresses '3' and '2' of the respective banks BANK0 and BANK1, i.e., at the addresses '6' and '5' of the stack storage 300. The multiplexer 252 selects the adder's content ADD<3:0> of '3' in response to the select control signal SB1. The MUX1<3:0> of '3' is provided to the high-order bits MSP<4:1> of the main stack pointer 210 with the least significant bit MSP<0> of '1', so that the main stack pointer 210 contains '00111' (=7) as illustrated in FIG. 5C.

Next, during a one-word pop operation (assuming as in the above example that the main stack pointer 210 contains '5'), the multiplexer 254 selects the MSP<4:1> of '2' in response to the MUX enable signal EB2 and select control signal SB3 while the multiplexer 253 is disabled by the MUX enable signal EB1, so that the first bank stack pointer 230 contains '2'. Accordingly, the top one-word item is removed from location at the bank address '2' of the first bank BANK0, i.e., at the address '4' of the stack storage 300. In addition, the multiplexer 252 selects the MSP<4:1> in response to the select control signal SB1 and outputs MUX1<3:0> of '2', which is then fed back to the main stack pointer 210. The control logic circuit 255 generates the control signal SB4 to toggle the MSP<0> of '1' (refer to FIG. 7B), so that the main stack pointer contains '00100' (=4) as illustrated in FIG. 5D.

Next, during a two-word pop operation (assuming as in the above example that the main stack pointer 210 contains '5'), the adder 251 adds '−1' to the MSP<4:1> in response to the instruction decoding signal DSCB1 and the multiplexer 252 selects the ADD<n−1:0> of '1' in response to he select control signal SB1. The multiplexer 253 selects the ADD <3:0> of '1' in response to the select control signal SB2, whereas the multiplexer 254 selects the MSP<4:1> of '2' in response to the select control signal SB3. As a result, the first bank stack pointer 230 contains '2' and the second stack pointer 240 contains '1'. Accordingly, the two-word item is removed from the locations at the bank addresses '2' and '1' of the respective banks BANK0 and BANK1, i.e., at the address '4' and '3' of the stack storage 300. The MUX1<3:0> of '1' is provided to the MSP<4:1> of the main stack pointer 210, so that the main stack pointer 210 contains '00011' (=3) as illustrated in FIG. 5E.

As described above, an embedded hardware stack having an architecture in accordance with the teachings herein can advantageously perform multi-word stack operations, as well one-word operations, thereby improving the performance of processors having such stack architectures.

Although the present invention and its advantages have been described in detail, it should be understood that various changes, substitutions and alterations can be made herein without departing from the spirit and scope of the invention as defined by the appended claims.

What is claimed is:

1. A digital data processor, comprising:
   a stack storage including a plurality of locations, wherein each of the locations of said stack storage are assigned to one of a first bank and a second bank;
   a main stack pointer for pointing to a top location of said stack storage;
   a first bank stack pointer for pointing to a location assigned to said first bank;
   a second bank stack pointer for pointing to a location assigned to said second bank;
   an instruction decoder for decoding a stack-based instruction and generating a plurality of decoding signals, each of the plurality of decoding signals denoting one of a one-word push operation, a one-word pop operation, a two-word push operation and a two-word pop operation; and a stack pointer control logic circuit for controlling said first and second bank stack pointers in response to at least one of the decoding signals to insert bank address data into the first and second bank stack pointers based on the content of the main stack pointer to perform a multi-word push or multi-word pop operation, wherein said stack pointer control logic circuit includes:

an adder for adding one of plurality of predetermined integers to a content of said main stack pointer in response to a first decoding signal from said instruction decoder;

a first selector for selecting for output one of the content of the main stack pointer and a content of said adder in response to a second decoding signal from said instruction decoder, wherein the output of said first selector comprises a high-order bit portion and a low-order bit portion;

a first control logic for generating a first control signal in response to the low-order bit portion of the output from said first selector and a third decoding signal from said instruction decoder;

a second control logic for generating a second control signal in response to the low-order bit portion of the output from said first selector and a fourth decoding signal from said instruction decoder;

an increment logic for incrementing the high-order bit portion of the output from said first selector;

a second selector for selecting one of the high-order bit portion of the output from said first selector and the output of said increment logic in response to the first control signal; end a third selector for selecting one of the high-order bit portion of the output from said first selector and the output of said increment logic in response to the second control signal;

wherein the outputs of said second and third selectors are provided to said second and first bank stack pointers, respectively.

2. The digital data processor of claim 1, wherein said plurality of predetermined integers include one of +1, +2, −1 and −2; and wherein said increment logic increments the high-order bit portion of the output from said first selector by one.

3. The digital data processor of claim 1, wherein said main stack pointer is updated by the content of said adder.

4. The digital data processor of claim 1, wherein said low-order bit portion of the output from said first selector comprises the least significant bit of the output from the first selector.

5. The digital data processor of claim 4, wherein said first and second control logics alternately enable said second and third selectors, respectively, based on logic states of the least significant bit of the output from the first selector, during the one-word push and pop operations.

6. The digital data processor of claim 5, wherein said second selector is enabled when the least significant bit of the output from said first selector is loge >1'.

7. The digital data processor of claim 5, wherein said third selector is enabled when the least significant bit of the output from said first selector is logic >0'.

8. The digital data processor of claim 4, wherein said first and second control logics enable both of said second and third selectors, irrespective of logic states of the least significant bit of the output from said first selector, during the two-word push and pop operations.

9. A digital data processor, comprising;

a stack storage including a plurality of locations, wherein each of the locations of said stack storage are assigned to one of a first bank and a second bank;

a main stack pointer for pointing to a top location of said stack storage;

a first bank stack pointer for pointing to a location assigned to said first bank;

a second bank stack pointer for pointing to a location assigned to said second bank;

an instruction decoder for decoding a stack-based instruction and generating a plurality of decoding signals, each of the plurality of decoding signals denoting one of a one-word push operation, a one-word pop operation, a two-word push operation and a two-word pop operation; and a stack pointer control logic circuit for controlling said first and second bank stack pointers in response to at least one of the decoding signals to insert bank address data into the first and second bank stack pointers based on the content of the main stack pointer to perform a multi-word push or multi-word pop operation, wherein said stack pointer control logic circuit comprises:

an adder adds one of a plurality of predetermined integers to a high-order bit portion of a content of said main stack pointer in response to a first decoding signal from said instruction decoder;

a control logic for generating one of a first, second, third, and fourth control signals, and combination thereof, in response to a low-order bit portion of the content of said main stack pointer and a second decoding signal from said instruction decoder;

a first selector for selecting one of the high-order bit portion of the content of said main stack pointer and an output of said adder in response to the first control signal;

a second selector for selecting one of the high-order bit portion of the content of said main stack pointer and the output of said adder in response to the second control signal; and a third selector for selecting one of the high-order bit portion of the content of said main stack pointer and the output of said adder in response to the third control signal;

wherein outputs of said second and third selector are provided to said second and first bank stack pointers, respectively, and the low-order bit portion of the content of said main stack pointer is controlled by the fourth control signal.

10. The digital data processor of claim 9, wherein the plurality of predetermined integers comprise +1 and −1.

11. The digital data processor of claim 9, wherein said high-order bit portion of the content of said main stack pointer is updated by the content of said adder.

12. The digital data processor of claim 9, wherein said low-order bit portion of the content of said main stack pointer comprises a least significant bit of the content of said main stack pointer.

13. The digital data processor of claim 12, wherein said control logic alternately enables said second and third selectors, based on logic states of the least significant bit of the content of said main stack pointer, during the one-word push and pop operations.

14. The digital data processor of claim 13, wherein said second selector is enabled when the least significant bit of the content of said main stack pointer is logic >1'.

15. The digital data processor of claim 13, wherein said third selector is enabled when the least significant bit of the content of said main stack pointer is logic >0'.

16. The digital data processor of claim 12, wherein said control logic toggles the least significant bit of the content of said main stack pointer during the one-word push sad pop operations.

17. The digital data processor of claim 9, wherein said control logic enables both said second and third selectors, irrespective of logic states of the least significant bit of the content of said main stack pointer, during the two-word push and pop operations.

* * * * *